US012269464B2

United States Patent
Qian et al.

(10) Patent No.: US 12,269,464 B2
(45) Date of Patent: Apr. 8, 2025

(54) TRAJECTORY DETERMINATION BASED ON POSE DATA

(71) Applicant: Zoox, Inc., Foster City, CA (US)

(72) Inventors: Steven Cheng Qian, San Francisco, CA (US); Zheyuan Xie, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 120 days.

(21) Appl. No.: 18/087,681

(22) Filed: Dec. 22, 2022

(65) Prior Publication Data

US 2024/0208486 A1    Jun. 27, 2024

(51) Int. Cl.
| | | |
|---|---|---|
| B60W 30/06 | (2006.01) | |
| B60W 50/00 | (2006.01) | |
| B60W 60/00 | (2020.01) | |

(52) U.S. Cl.
CPC ........ B60W 30/06 (2013.01); B60W 50/0098 (2013.01); B60W 60/0011 (2020.02)

(58) Field of Classification Search
CPC ............. B60W 30/06; B60W 60/0011; B60W 50/0098
See application file for complete search history.

(56) References Cited

U.S. PATENT DOCUMENTS

| | | | |
|---|---|---|---|
| 2017/0129538 A1 | 5/2017 | Stefan | |
| 2019/0027042 A1* | 1/2019 | Fujishima | ............. B60W 30/06 |
| 2019/0204850 A1* | 7/2019 | Panzica | ............. G01C 21/3658 |
| 2020/0001862 A1 | 1/2020 | Luo | |
| 2022/0073101 A1 | 3/2022 | Wang | |

FOREIGN PATENT DOCUMENTS

WO    WO-2018131322 A1 *    7/2018    ............ B60W 30/06

OTHER PUBLICATIONS

The PCT Search Report and Written Opinion mailed Apr. 19, 2024 for PCT Application No. PCT/US2023/083621 from PCT Summary, 10 pages.
U.S. Appl. No. 18/072,015, filed Nov. 30, 2022, Narayanan, et al., "Vehicle Trajectory Tree Search for Off-Route Driving Maneuvers", 66 pages.

* cited by examiner

*Primary Examiner* — Quan Zhen Wang
*Assistant Examiner* — Mancil Littlejohn, Jr.
(74) *Attorney, Agent, or Firm* — Lee & Hayes, P.C.

(57) ABSTRACT

Techniques for determining a parking trajectory for an autonomous vehicle. In some examples, a vehicle may navigate to a destination within an environment. The vehicle may receive parking locations proximate the destination, and determine a cost for navigating to each parking location, or multiple locations within a parking space. Each of multiple trajectories may include desired state(s) that represent the desired state information of the vehicle at a specific locations along the trajectory. The vehicle may determine a cost for the trajectory by comparing the predicted pose of the vehicle at the parking state to the target pose of the parking location. The vehicle may follow the trajectory based on the cost.

20 Claims, 8 Drawing Sheets

TRAJECTORY DETERMINATION BASED ON POSE DATA

BACKGROUND

An autonomous vehicle may navigate along designated routes or between waypoints. For example, when a control system receives a request from a user device to pick up a passenger or cargo at a location and provide transport to a destination location, the autonomous vehicle may receive, from the control system, instructions to navigate from the pickup location to the destination location. In some circumstances, the autonomous vehicle may be required to park in order to pick the passenger or cargo up at the pickup location or drop off the passenger or cargo at the destination location. In some instances, such as when the area of the pickup location and/or destination location includes parking spaces, the vehicle trajectories may cause the vehicle to stop at suboptimal positions within the parking space.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
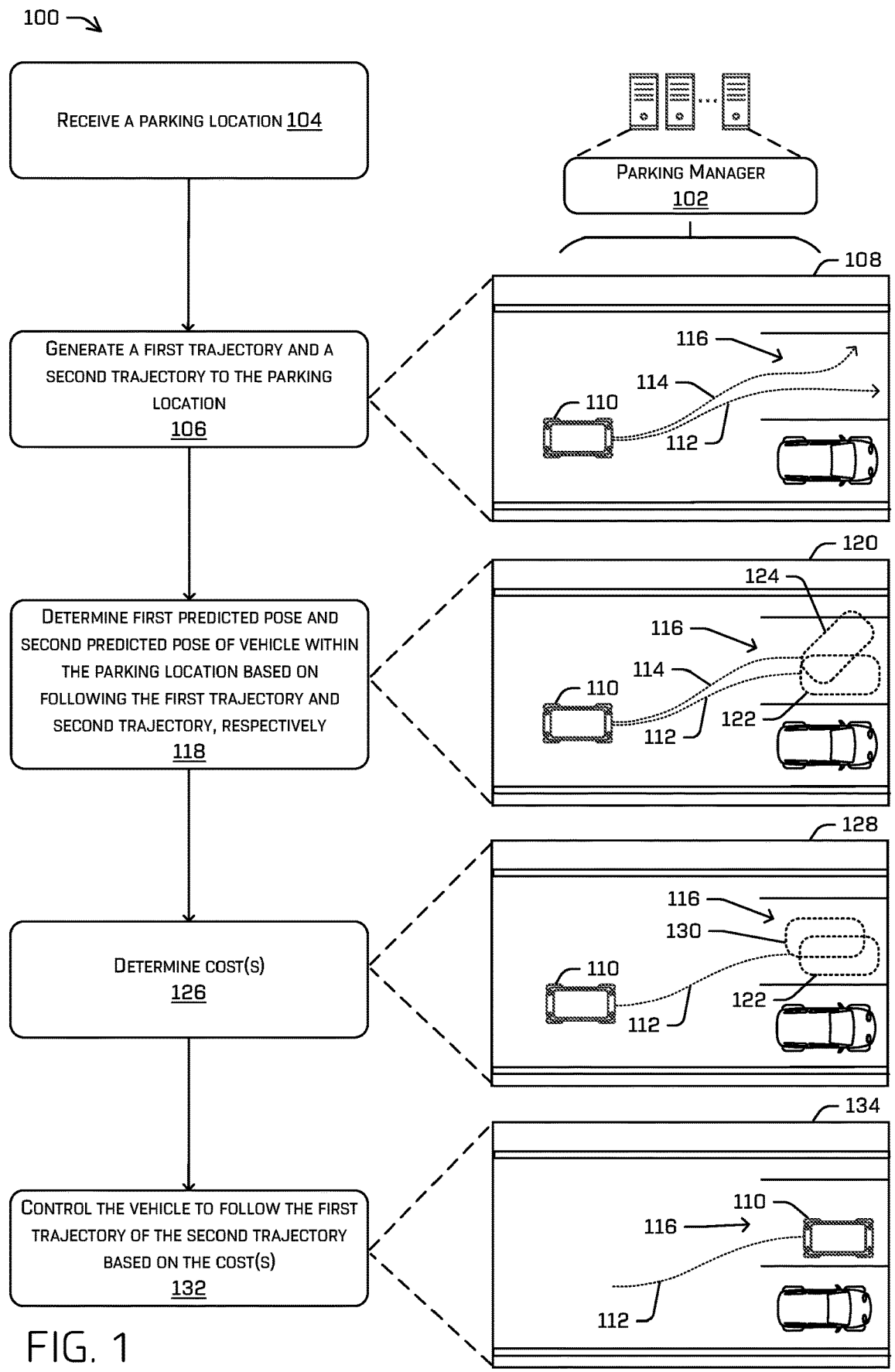
FIG. 1 is a pictorial flow diagram illustrating an example technique for determining a parking trajectory based on predicted pose data, in accordance with one or more examples of the disclosure.

Techniques for determining a parking trajectory for a vehicle are described herein. In some examples, a parking state of a trajectory may be identified and evaluated to determine which of a number of parking trajectories a vehicle should follow. In some examples, a vehicle (such as an autonomous vehicle) may navigate to a destination (e.g., pickup location, drop off location, delivery location, service location etc.) within an environment while in a primary navigation mode (which may, in some examples, rely on map data, lane references, and the like). Upon determining that the vehicle is within a threshold distance from the destination, the vehicle may transition to a parking mode configured to identify a parking location for the autonomous vehicle and generate trajectories in a manner other than with respect to those methods used in the primary navigation mode. In such instances, the autonomous vehicle may receive and/or identify one or more parking locations proximate the destination, and determine a cost associated with navigating to each parking location. For example, upon receiving the parking locations, the vehicle may generate one or more trajectories that the vehicle may follow to a specific parking location. Each trajectory may include numerous predicted states that represent the predicted state information (e.g., location data, pose data (e.g., lateral offset data, longitudinal offset data, heading offset data), velocity data, etc.) of the vehicle at a specific location along the trajectory. In some examples, the vehicle may identify the state that represents the vehicle while parked (e.g., parking state) within the parking location based on determining that the velocity of the vehicle is at or below a threshold value. Based on identifying the parking state, the vehicle may determine a cost for the trajectory by comparing the predicted pose of the vehicle at the parking state to the target pose of the parking location. The vehicle may select or otherwise determine to follow the trajectory based on the cost. As discussed throughout this disclosure, the techniques described herein may improve vehicle safety, driving efficiency, and parking efficiency by ensuring that the predicted pose of the vehicle within the parking location is evaluated, thereby determining optimal parking trajectories and/or locations.

In some examples, an autonomous vehicle may navigate within a driving environment. For example, an autonomous vehicle may receive requests to transport pedestrians and/or customers between pickup and drop off locations. Further, autonomous vehicles may also be instructed to deliver goods and/or services within particular regions of the environment. As such, the autonomous vehicle may generate one or more trajectories to follow while traversing to the destination.

As the autonomous vehicle approaches the destination, the vehicle may attempt to perform a parking action. Performing a parking action may include the vehicle identifying one or more available parking spaces and determining at which parking space the vehicle should park. In some examples, a parking space can be determined based on map data and/or based on sensor data identifying portion(s) of an environment suitable for parking (e.g., out of traffic, free from obstacles such as pedestrians, water, debris, etc.). Based on the vehicle identifying the potential parking location(s), the vehicle may generate one or more candidate trajectories for the vehicle to follow to such parking locations (e.g., parking spaces). In such instances, the candidate trajectory may instruct the vehicle to navigate through the environment and perform a parking action by entering the parking location and stopping the vehicle.

In some examples, the candidate trajectory generated by the vehicle may cause the vehicle to park in problematic and/or inadequate regions (e.g., zones) of the parking location. For example, the vehicle may determine that it is within a threshold distance from a destination, and as such, may identify locations to park. In such examples, the vehicle may generate a number of potential trajectories that instruct the vehicle how to navigate within the environment to the parking space. However, such potential trajectories may instruct the vehicle to stop (e.g., park) in problematic locations and/or angles within the parking space. For example, the potential trajectory may cause the vehicle to stop too close to a curb which may restrict the entry and exit of the vehicle's passengers. Further, the trajectory may cause the vehicle to stop at an angle within the parking space which may restrict the safety of the vehicle while exiting the parking location. In yet other examples, the trajectory may cause the vehicle to stop too close to an edge (e.g., border, boundary, etc.) of the parking space, potentially interfering with the entry or exit of passengers of adjacent vehicles. Further, parking too close to a boundary may also increase the likelihood of a potential collision as other vehicles enter and exit adjacent parking spaces. Consequently, the potential trajectories may cause the vehicle to park at suboptimal positions and/or regions within the parking space.

To address these and other technical problems and inefficiencies, the techniques described herein include a parking system (which also may be referred to as a "parking manager" or a "parking component") to select or otherwise determine parking trajectories based on a predicted vehicle pose within a parking space. Further, the parking manager may leverage vehicle state data of a predicted trajectory to determine the pose of a vehicle when in a parked state within the parking space. Technical solutions discussed herein solve one or more technical problems associated with selecting parking trajectories which cause autonomous vehicles to park at a problematic location and/or orientation within a parking space.

Initially, the parking manager may receive and/or generate a trajectory to follow to a destination within an environment. A vehicle may receive a request and/or instructions to navigate to a destination. Such requests may include transporting pedestrians and/or customers between pickup and drop off locations, in addition to delivering goods and/or services to regions of the environment. Based on the request, the vehicle may receive a trajectory to follow while navigating through the environment to the destination.

In some examples, the vehicle may transition mode types based on being within a threshold distance of the destination. The vehicle may utilize numerous operation modes configured to instruct the vehicle how to generate and/or select trajectories. Use of such modes may be determined based on the location of the vehicle within the environment, the location of the vehicle relative to the destination, and/or the action being performed by the vehicle. In some examples, different operating mode types may cause the vehicle to generate different cost measurements when generating, selecting, and/or determining a trajectory to follow. When operating in a primary mode, the vehicle may generate a first set of costs. In such instances, the vehicle may use the first set of costs to generate a trajectory and/or determining which potential trajectory to select while navigating to the destination. Further, when operating in a parking mode, the parking manager may generate a second set of costs. The second costs may include some or all of the first set of costs, in addition to additional costs. Based on being in a parking mode, the parking manager may generate additional costs associated with selecting parking trajectories and/or parking spaces. In some examples, the vehicle may transition from the primary mode to a parking mode based on determining that the vehicle is within a threshold distance from the destination. In such instances, the threshold distance may be determined based on a number of different factors, such as the environment type, time of day, and/or other factors. In other situations, the threshold distance may be a fixed distance.

In some examples, the vehicle may receive one or more potential parking spaces for the vehicle. The vehicle may receive a set of parking locations (e.g., parking spaces, parking garages, parking lots, etc.) within a threshold distance of the destination. The vehicle may receive the set of parking locations from a database (e.g., on-vehicle database or off-vehicle database) available to the vehicle. The database may include map data that indicates the locations of parking spaces proximate the destination. In addition to receiving the set of parking spaces and the associated locations of such parking spaces, the parking manager may also receive target poses (e.g., stored in the database with the parking spaces) associated with each received parking space. A target pose may represent an optimal position and orientation (two- or three-dimensional heading) of a vehicle within the parking space. The target position may include a target lateral offset (e.g., y-axis) coordinate and a target longitudinal offset (e.g., x-axis) coordinate of the vehicle.

In some examples, the parking manager may generate multiple candidate trajectories for the vehicle to follow to the parking spaces. Upon receiving the set of potential parking spaces, the parking manager may generate one or more candidate trajectories to some or all parking spaces. For example, if the parking manager receives five potential parking spaces, the parking manager may generate one or more candidate trajectories to each of the five potential parking spaces. Of course, this is merely an example, and in other examples the parking manager may receive more or less potential parking spaces. In some examples, some or all of the candidate trajectories may differ from one another based on the velocity, the pose, and/or the acceleration of such candidate trajectories. Further, such candidate trajectories may cause the vehicle to stop and/or be positioned at different locations within the parking space. For example, some or all of the candidate trajectories may include a different predicted pose of the vehicle within the parking space.

In some examples, the candidate trajectories may include numerous predicted states that represent the state information of the vehicle at a specific location along the candidate trajectory. For example, a candidate trajectory may have a number of states that represents what the state of a vehicle may be at a specific moment on the trajectory. State information may include location data, pose data (e.g., lateral offset data, longitudinal offset data, heading offset data), velocity data, acceleration data, and/or other elements. As such, the parking manager may evaluate the predicted states to determine where the vehicle may be and/or characteristics of the vehicle's movement at a future time based on following the candidate trajectory.

In some examples, the parking manager may identify parking states for each candidate trajectory. The parking manager may evaluate some or all of the candidate trajectories by identifying which on the number of states is the parking state of the candidate trajectory. For example, the parking manager may identify the parking state of a vehicle following a trajectory based on the predicted velocity. In such instances, the parking manager may evaluate the predicted velocity at the various states and identify a state with a predicted velocity that is less than or equal to a threshold value. A state that has a predicted velocity at or below a threshold velocity may indicate that the vehicle has stopped. Further, such a stopped vehicle may indicate that the vehicle has completed the candidate trajectory and is located (e.g., parked) within the parking space. In some instances, such states may be identified as parking states.

In some examples, the parking manager may determine a cost associated with the candidate trajectories. Based on identifying the parking state of a candidate trajectory, the parking manager may use the state information of the vehicle at the parking state to generate a cost associated with the candidate trajectory. In this example, a cost may be a measurement that represents how closely aligned the predicted pose of the vehicle at the parking state is with the target pose of the parking space. In such instances, the closer the values of the predicted pose are to the values of the target pose, the lower the cost (e.g., score) will be. In some examples, the cost is determined by comparing the predicted pose of the vehicle at the parking state to the target pose of the parking space. As described above, the predicted pose may include a predicted lateral offset, a predicted longitudinal offset, and a predicted heading offset. The target pose may include a target lateral offset, a target longitudinal offset, and a target heading offset. In some examples, the parking manager may determine a first value based on comparing the predicted lateral offset to the target lateral offset, a second value based on comparing the predicted longitudinal offset to the target longitudinal offset, and a third value based on comparing the predicted heading offset to the target heading offset. In such instances, the parking manager may determine the score based on combining (e.g., using mathematical operations) the first value, the second value, and the third value. In some examples, the cost may be associated with the candidate trajectory.

In some examples, the parking manager may assign different weight(s) (e.g., scaling factor) to any one of the pose elements. For example, the parking manager may determine that it is advantageous for the vehicle to park within a threshold distance from one of the elements of the target pose. For example, the parking manager may determine that a lateral error is more important than other errors (e.g., longitudinal, heading, etc.). In such instances, the parking manager may apply a weight (e.g., scaling factor) to the lateral variable to ensure that the trajectories that are closely aligned laterally are prioritized. Such a weight may modify the value of the pose element. In other examples, based on identifying that it may be advantageous for the vehicle to parkin within a threshold distance from the target lateral offset, the parking manager may modify the predicted lateral offset and/or target lateral offset to ensure a better cost measurement. In some examples, the parking manager may determine a cost for some or all of the candidate trajectories.

In some examples, the parking manager may select or otherwise determine the potential trajectory to follow to the parking location. The parking manager may determine which candidate trajectory to select based on the generated costs. In some instances, the parking manager may select the candidate trajectory with the lowest cost value. If the parking manager is selecting a candidate trajectory based on multiple different parking spaces, the parking manager may identify the candidate trajectories with the lowest costs from each parking space and compare such costs to identify which parking space and/or candidate trajectory to select.

Such techniques may be particularly advantageous when used in conjunction with methods for generating a trajectory based at least in part on a tree search, as is described in U.S. patent application Ser. No. 18/072,015 entitled "Vehicle Trajectory Tree Search for Off-Route Driving Maneuvers" filed on Nov. 30, 2022, the entire contents of which are hereby incorporated by reference herein. In such a tree search, trajectories may be selected and/or optimized based on associated costs, including all costs to arrive at a node along the tree (cost-to-come) and a cost to arrive at a final destination from the node (e.g., a cost-to-go). In such examples, the parking cost may be associated with an infinite time horizon such that it is correctly accounted for in any cost-to-go optimizations, as will be described in more detail below.

In some examples, the parking manager may cause the vehicle to traverse to the parking space based on the candidate trajectory. Upon identifying the candidate trajectory with the lowest cost, the vehicle may follow the trajectory to the parking space. Further, the trajectory may cause the vehicle to park within the parking space according to the state information.

As illustrated by these examples, the techniques discussed herein can improve the functioning, safety, and efficiency of the autonomous and semi-autonomous vehicles operating in various driving environments. The use of a vehicle's predicted pose within a parking space may allow a vehicle to more efficiently select optimal parking trajectories. For example, an autonomous vehicle may use state information to identify the predicted pose of a vehicle while parked in a parking space. Further, the vehicle may use such pose data to determine whether the trajectory causes the vehicle to park in an optimal position and/or orientation. Such techniques ensure that the autonomous vehicle selects a trajectory that will enable the vehicle to park within a threshold distance of a predetermined target pose, further ensuring that the vehicle does not restrict the movement of the vehicle's occupants and/or adjacent vehicles and the associated occupants.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or robotic platform), and are not limited to autonomous vehicles. In one example, similar techniques may be utilized in driver-controlled vehicles in which such a system may assume control of the vehicle to park the vehicle or provide an indication of whether it is safe to perform various maneuvers. In other examples, any or all of the techniques described herein may be implemented in other machine vison systems, such as security systems, object inspection and/or quality assurance systems, environment monitoring systems, etc. Moreover, even though the vehicles described herein are depicted as land vehicles, in other examples such vehicles may be aircraft, spacecraft, watercraft, and/or the like.

FIG. 1 is a pictorial flow diagram illustrating an example process 100 for determining a parking trajectory based on predicted pose data of a vehicle within a parking space. As shown in this example, some or all of the operations in the example process 100 may be performed by a parking manager component integrated within a perception component, a prediction component, a planning component, and/or other components and systems within an autonomous vehicle. For instance, as shown in this example, example process 100 may be implemented using a parking manager 102. As described below in more detail, the parking manager 102 may include various components, such as a parking state identifier, a cost generator, and/or a trajectory component, which may be configured to receive potential parking spaces, generate candidate trajectories to the parking spaces, identify a predicted pose of the vehicle within the parking space based on the vehicle following the candidate trajectories, generate a cost associated with the candidate trajectories, and/or control the vehicle based on the candidate trajectory with the lowest cost.

At operation 104, the parking manager 102 may receive one or more parking locations. A vehicle may receive a request and/or instructions to navigate to a destination. Based on the request, the vehicle may receive a trajectory to follow while navigating through the environment to the destination.

In some examples, the vehicle may transition mode types based on being within a threshold distance of the destination. The vehicle may utilize numerous operation modes configured to instruct the vehicle how to generate and/or select trajectories. In some examples, different operating mode types may cause the vehicle to generate different cost measurements when generating and/or selecting a trajectory to follow. When operating in a primary mode, the vehicle may generate a first set of costs. In such instances, the vehicle may use the first set of costs to generate a trajectory and/or determining which potential trajectory to select while navigating to the destination. Further, when operating in a parking mode, the parking manager may generate a second set of costs. The second costs may include some or all of the first set of costs, in addition to parking related costs. Based on being in a parking mode, the parking manager may generate additional costs associated with selecting parking trajectories and/or parking spaces. In some examples, the vehicle may transition from the primary mode to a parking mode based on determining that the vehicle is within a threshold distance from the destination. As a non-limiting example, a trajectory may comprise a series of states and/or controls from a current state to a final state. During parking (or, when in a parking mode), the trajectory may be associated with a first set of costs determined for a state of the series of states prior to the final state and an additional cost associated with the final, parking, state.

In some examples, the vehicle may receive one or more potential parking spaces for the vehicle. The vehicle may receive and/or determine a set of parking spaces within a threshold distance of the destination. The vehicle may receive the set of parking locations from a database (e.g., on-vehicle database or off-vehicle database) available to the vehicle. The database may include map data that indicates the locations of parking spaces proximate the destination. In some examples, the database may be dynamically updated. For example, a vehicle may pass by the geographic region and capture sensor data about parking spaces in the geographic region and use the sensor data to update the database. As another example, a drone may fly over the geographic region and capture sensor data about parking spaces in the geographic region and use the sensor data to update the database. In addition to receiving the set of parking spaces and the associated locations of such parking spaces, the parking manager may also receive target poses (e.g., stored in the database with the parking spaces) associated with each received parking space. A target pose may represent an optimal position and orientation (two- or three-dimensional heading) of a vehicle within the parking space. The target position may include a target lateral offset (e.g., y-axis) coordinate and a target longitudinal offset (e.g., x-axis) coordinate of the vehicle.

At operation 106, the parking manager 102 may generate a first trajectory and a second trajectory for the vehicle to follow to the parking location. Upon receiving parking spaces, the parking manager 102 may generate one or more candidate trajectories to the parking space. For example, box 108 illustrates an autonomous vehicle 110 navigating to a destination within the environment and generating multiple candidate trajectories to a parking space. In this example, the box 108 may include a vehicle 110 with multiple generated trajectories. Specifically, the vehicle 110 includes a first trajectory 112 and a second trajectory 114. In at least some examples, such trajectories may be determined in accordance with a tree search in which multiple actions are considered at various nodes along the tree. As shown in box 108, the first trajectory 112 and the second trajectory 114 may cause the vehicle to navigate to a parking space 116. In this example, the parking space 116 includes stall parking, however, in other examples the parking space may be a different type of parking space.

In some examples, the first trajectory 112 and the second trajectory 114 may cause the vehicle 110 to park in different positions and/or at different orientations within the parking space 116. For example, the first trajectory 112 and the second trajectory 114 may have different velocities, poses, and/or the accelerations. Further, such trajectories may cause the vehicle 110 to stop and/or be positioned at different locations within the parking space 116. For example, the first trajectory 112 may cause the vehicle 110 to be positioned closer to the back of the parking space 116 compared to the second trajectory 114. Further, the second trajectory 114 may cause the vehicle 110 to park with the orientation that faces the side of the parking space 116, whereas the first trajectory 112 may cause the vehicle to be oriented with the heading offset that faces the back of the parking space 116. As will be discussed in detail herein, a preferred trajectory may comprise an overall lowest cost to achieve a parking state such that a poor parking state (e.g., offset, crooked, etc.) may still result in an optimal overall trajectory.

In some examples, the first trajectory 112 and the second trajectory 114 may include numerous predicted states that represent the state information of the vehicle 110 at a specific location (and/or point in time) along such trajectories. For example, a trajectory may have a number of states that represents what the state of a vehicle 110 may be at a specific moment on the trajectory. State information may include location data, pose data (e.g., lateral offset data, longitudinal offset data, heading offset data), velocity data, acceleration data, and/or other elements. In at least some examples, such state information may further comprise or otherwise be associated with control information. As such, the parking manager 102 may evaluate the predicted states to determine where the vehicle 110 may be and/or characteristics of the vehicle's 110 movement at a future time based on following the trajectory.

In some examples, the parking manager 102 may identify a first parking state for the first trajectory 112 and a second parking state for the second trajectory 114. The parking manager 102 may evaluate the trajectories by identifying which on the numerous states is the parking state of the trajectories. For example, the parking manager 102 may identify the parking state of the vehicle 110 following a trajectory based on the predicted velocity. In such instances, the parking manager 102 may evaluate the predicted velocity at the various states and identify a state with a predicted velocity that is less than a threshold value. A state that has a predicted velocity below a threshold velocity may indicate that the vehicle 110 has stopped. Further, such a stopped vehicle 110 may indicate that the vehicle 110 has completed the trajectory and is located (e.g., parked) within the parking space 116. In some instances, such states may be identified as parking states. In this example, the parking manager 102 may identify a first parking state for the first trajectory 112 which may be when the vehicle 110 is located at the end of the first trajectory 112 within the parking space 116. Further, the parking manager 102 may identify a second parking state for the second trajectory 114 which may be when the vehicle 110 is located at the end of the second trajectory 114 within the parking space 116. In several such examples, parking states may be based at least in part on exploration of a tree by expanding nodes over multiple potential actions as may be constrained based at least in part on kinematic or dynamic constraints, policies, or the like.

At operation 118, the parking manager 102 may determine a first predicted pose and a second predicted pose of the vehicle 110 within the parking space 116 based on the vehicle 110 following the first trajectory 112 and the second trajectory 114, respectively. In some such examples, poses may be a result of the tree search. As described above, state information may include location data, pose data (e.g., lateral offset data, longitudinal offset data, heading offset data), velocity data, acceleration data, and/or other elements including, but not limited to control data/information. As such, the parking manager 102 may utilize the state information associated with the first parking state and the second parking state to determine what the first pose of the vehicle 110 is predicted to be based on following the first trajectory 112, in addition to determining what the second pose of the vehicle 110 is predicted to be based on the vehicle following the second trajectory 114. For example, box 120 illustrates predicted poses of a vehicle within the parking space 116. In this example, box 120 includes a first predicted pose 122 and a second predicted pose 124. The first predicted pose 122 may be representative of the position and orientation of the vehicle 110 based on the vehicle 110 following the first trajectory 112. Further, the second predicted pose 124 may be representative of the position and orientation of the vehicle 110 based on the vehicle 110 following the second trajectory 114. In some examples, the first predicted pose 122 may include a first predicted lateral offset, a first predicted longitudinal offset, and a first predicted heading offset. Additionally, the second predicted pose 124 may include a second predicted lateral offset, a second predicted longitudinal offset, and a second predicted heading offset.

At operation 126, the parking manager 102 may determine a first cost based on comparing the first predicted pose 122 to a target pose, in addition to determining a second cost based on comparing the second predicted pose 124 to the target pose. A cost may be a measurement that represents how closely aligned a predicted pose of the vehicle 110 at the parking state is with the target pose of the parking space 116. In such instances, the closer the values of the predicted pose are to the values of the target pose, the lower the cost (e.g., score) will be. For example, box 128 illustrates the first predicted pose being compared to a target pose of the parking space 116. In this example, the box 128 includes a target pose 130. As described above, the target pose 130 may represent an optimal position and orientation (two- or three-dimensional heading) of a vehicle 110 within the parking space 116. In some examples, the target pose 130 may include a target lateral offset, a target longitudinal offset, and a target heading offset.

In some examples, the cost is determined by comparing the predicted pose of the vehicle 110 at the parking state to the target pose of the parking space 116. For example, the parking manager 102 may determine a first cost associated with the first trajectory 112. The parking manager 102 determines the first cost by determining a first value based on comparing the first predicted lateral offset to the target lateral offset, a second value based on comparing the first predicted longitudinal offset to the target longitudinal offset, and a third value based on comparing the first predicted heading offset to the target heading offset. In such instances, the parking manager 102 may determine the score based on combining (e.g., using mathematical operations) the first value, the second value, and the third value including, as a non-limiting example, a weighted average. In some examples, the first cost may be associated with the first trajectory 112. In some examples, the same or similar functions may be performed to determine a second cost associated with the second trajectory.

At operation 132, the parking manager 102 may control the vehicle to proceed with the first trajectory based on the first cost being lower than the second cost. In some examples, the parking manager 102 may determine which trajectory to follow to the parking space 116. The parking manager 102 may determine whether to follow the first trajectory 112 or the second trajectory 114 based on which trajectory has the lowest cost (e.g., in aggregate). For example, box 134 illustrates the autonomous vehicle 110 selecting and navigating to the parking space 116 based on the first trajectory 112. Further, the vehicle 110 may proceed to parking within the parking space 116 consistent with the first predicted pose 122. However, this example is not intended to be limiting, in other examples the parking manager 102 may select the second trajectory 114 and/or any other generated trajectory. In other examples, upon approaching the parking space 116, the autonomous vehicle 110 determine a height of one or more surrounding curbs or boundaries proximate to the parking space 116. In such instances, the autonomous vehicle 110 may modify the ride height of the vehicle to match or be within a threshold distance from the curb. Such an adjustment of the ride height may enable passengers to enter or exit the autonomous vehicle 110 directly onto the curb without having to step down. Alternatively, or additionally, the vehicle may determine to park a distance away from the curb in addition to lowering the ride height to ensure that passengers have a small distance to step off of the autonomous vehicle 110 to the ground. In any such example, the trajectory associated with the lowest cost may not necessarily be associated with the lowest parking cost.

Figure 2:
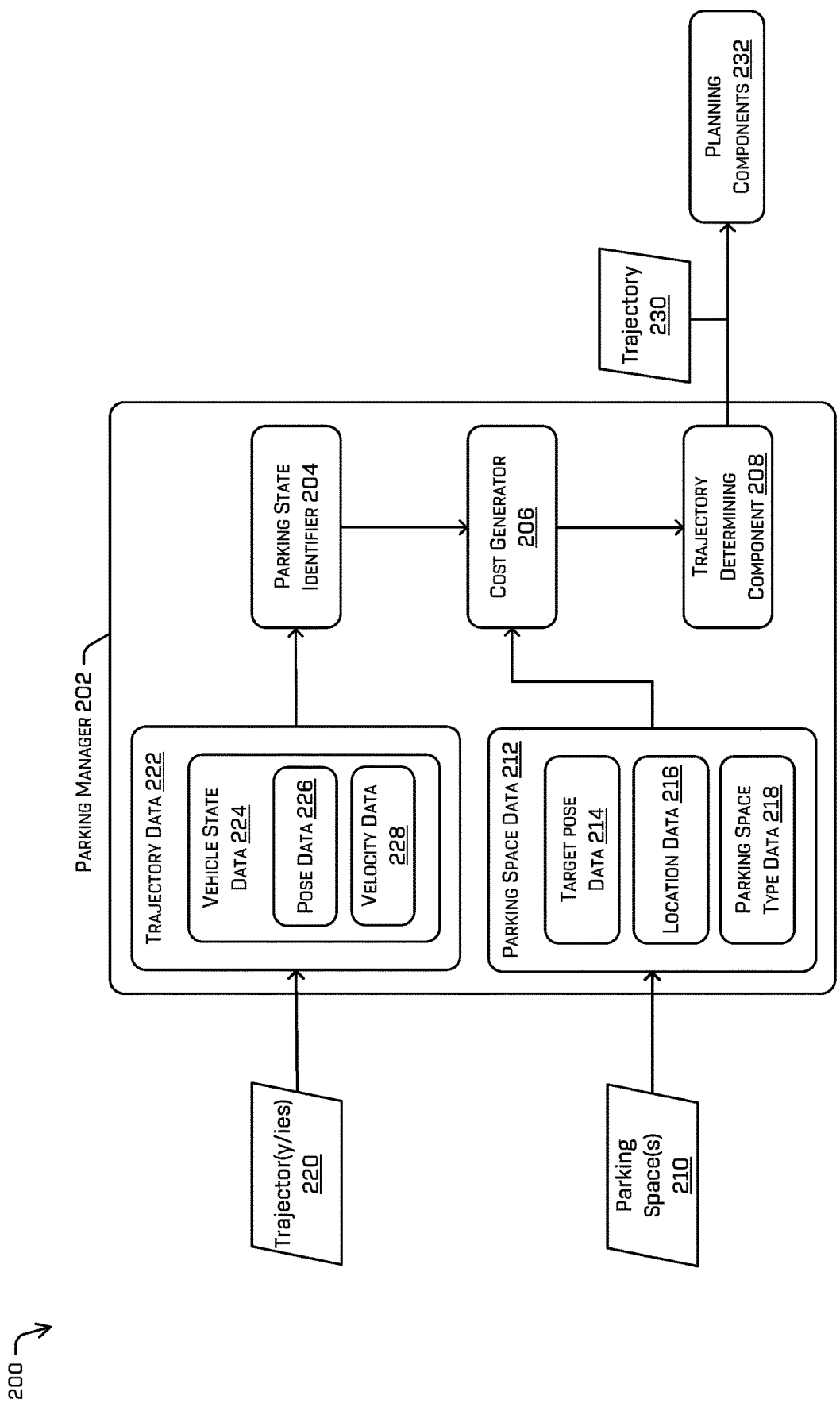
FIG. 2 illustrates an example computing system including a parking manager to determine a parking trajectory based on pose data, in accordance with one or more examples of the disclosure.

FIG. 2 illustrates an example computing system 200 including an example parking manager 202 configured to determine a parking trajectory based on pose data. In some examples, the parking manager 202 may be similar or identical to the parking manager 102 described above, or in any other examples herein. As noted above, in some cases the parking manager 202 may be implemented within or otherwise associated with a perception component, prediction component, and/or planning component of an autonomous vehicle. In some examples, the parking manager 202 may include a parking state identifier 204 configured to identify a parking state associated with a candidate trajectory. Additionally, the parking manager 202 may include a cost generator 206 configured to generate the cost associated with some or all candidate trajectories, and/or a trajectory determining component 208 configured to select a candidate trajectory based on the candidate trajectory having the lowest cost.

In some examples, the parking manager 202 may receive a set of parking spaces 210. In some examples, the parking spaces 210 may be parking spaces which are within a threshold distance from the destination of the vehicle. The parking spaces 210 may be received from a planning component, a prediction component, a database (e.g., on-vehicle database or off-vehicle database) available to the vehicle, and/or any other component. The database may include map data that indicates the locations of parking spaces 210 proximate the destination. In addition to receiving the parking spaces 210 and the associated locations of such parking spaces 210, the parking manager 202 may also receive target poses (e.g., stored in the database with the parking spaces) associated with each received parking space 210. A target pose may represent an optimal position and orientation (two- or three-dimensional heading) of a vehicle within the parking space. The target position may include a target lateral offset (e.g., y-axis) coordinate and a target longitudinal offset (e.g., x-axis) coordinate of the vehicle.

In some examples, the parking manager 202 may store such parking space 210 information within a parking space data 212 component. The parking space data 212 component may include subcomponents which may include a target pose data component 214 configured to receive, store, and/or analyze target poses associated with specific parking spaces 210. The parking space data 212 component may include a location data component 216 configured to receive, store, and/or analyze the location of such parking spaces 210. Further, the parking space data 212 component may include a parking space type data component 218 configured to receive, store, and/or analyze the type of parking space that was received. In some examples, the parking space data 212 component may be configured to send parking space data to the cost generator 206.

In some examples, the parking manager 202 may receive trajectories 220 to some or all parking spaces 210. Such trajectories 220 may be a path of the vehicle based on a combination of a current position of the vehicle, the vehicle dynamics, and/or map data. In some examples, some or all of the trajectories 220 may differ from one another based on the velocity, the pose, and/or the acceleration of such trajectories 220. Further, such trajectories 220 may cause the vehicle to stop and/or be positioned at different locations within the parking space 210. For example, some or all of the trajectories may include a different predicted pose of the vehicle within the parking space 210.

In some examples, the trajectories 220 may include numerous predicted states that represent the state information of the vehicle at a specific location along the trajectories 220. For example, a trajectory 220 may comprise a number of nodes that represents what the state of a vehicle may be at a specific moment on the trajectory 220 and/or associated control information. State information may include location data, pose data (e.g., lateral offset data, longitudinal offset data, heading offset data), velocity data, acceleration data, and/or other elements. As such, the parking manager 202 may evaluate the predicted states to determine where the vehicle may be and/or characteristics of the vehicle's movement at a future time based on following the trajectory 220.

In some examples, the parking manager 202 may store such trajectory 220 information within a trajectory data 222 component. The trajectory data 222 component may include subcomponents which may include a vehicle state data 224. The vehicle state data 224 may include a pose data 226 and a velocity data 228 component. The trajectory 222 component may include a pose data component 226 configured to receive, store, and/or analyze the pose of the vehicle following a particular trajectory 220. Further, the trajectory 222 component may include a velocity data component 228 configured to receive, store, and/or analyze the velocity of the vehicle following a particular trajectory 220. In some examples, the trajectory data component 222 may send trajectory information to a parking state identifier 204.

In some examples, the parking manager 202 may include a parking state identifier 204 configured to identify a parking state associated with a trajectory 220. The parking state identifier 204 may receive trajectory information from the trajectory data 222 component. In some examples, the parking state identifier 204 may identify parking states for the various receive trajectories 220. The parking state identifier 204 may evaluate some or all of the trajectories 220 by identifying which on the number of states is the parking state of the trajectory 220. For example, the parking state identifier 204 may identify the parking state of a vehicle following a trajectory 220 based on the predicted velocity. In such instances, the parking state identifier 204 may evaluate the predicted velocity at the various states and identify a state with a predicted velocity that is less than a threshold value. A state that has a predicted velocity below a threshold velocity may indicate that the vehicle has stopped. Further, such a stopped vehicle may indicate that the vehicle has completed the trajectory 220 and is located (e.g., parked) within the parking space. In some instances, such states may be identified as parking states.

In some examples, the parking manager 202 may include a cost generator 206 configured to generate the cost associated with some or all candidate trajectories. The cost generator 206 may receive parking space information from the parking space data component 212, in addition to receiving trajectory and/or state information from the parking state identifier 204. In some examples, the cost generator 206 may use the state information of the vehicle at some or all of the states prior to the parking state. Further, the cost generator 206 may use the state information for the states prior to the parking state to generate various additional costs. Such additional costs may include a progress cost, a safety cost, a comfort cost, an obstacle cost, a steering cost, an acceleration cost, and/or any other cost. In some examples, such costs may be used in determining an overall cost for the trajectory 220.

As described above and below, another additional cost that may be used in determining the overall cost of the trajectory 220 may be a parking cost based on the predicted pose of the vehicle at the final, parking state. The parking cost may be a measurement that represents how closely aligned the predicted pose of the vehicle at the parking state is with the target pose of the parking space 210. In such instances, the closer the values of the predicted pose are to the values of the target pose, the lower the parking cost (e.g., score) will be. In some examples, the parking cost is determined by comparing the predicted pose of the vehicle at the parking state to the target pose of the parking space 210. In some examples, the cost generator 206 may use a cost function to generate the parking cost, such as according to the following:

$$\text{Parking Cost} = K_{Heading}(h, t) + K_{Lateral\ Offset}|e*n| + K_{Longitudinal\ Offset}|e*t|$$

Where $K_{Heading}$ corresponds to a heading scaling factor, $K_{lateral\ Offset}$ corresponds to a lateral scaling factor, and $K_{Longitudinal\ Offset}$ corresponds to a longitudinal scaling factor. Further, "h" corresponds to the pose unit vector of the vehicle at the vehicle's final, parking state. In this example, "t" corresponds to the target pose unit vector at the final state, "n" corresponds to a target pose normal vector at the final state, and "e" corresponds to a vector from the vehicle to the target at the final state.

As described above, the predicted pose may include a predicted lateral offset, a predicted longitudinal offset, and a predicted heading offset. The target pose may include a target lateral offset, a target longitudinal offset, a target heading offset, a target ride height, a target door to open (in the case where a vehicle has multiple doors to open), and the like. In some examples, the parking manager may determine a first value based on comparing the predicted lateral to the target lateral offsets, a second value based on comparing the predicted longitudinal to the target longitudinal offset, and a third value based on comparing the predicted heading offset to the target heading offset. In such instances, the parking manager may determine the score based on combining (e.g., using mathematical operations including, but not limited to, a weighted average) or otherwise aggregating the first value, the second value, and the third value. In some examples, the cost may be associated with the candidate trajectory. In some examples, the cost generator 206 may use the parking cost to generate the overall cost for the trajectory 220. In such instances, the parking cost may be weighted and combined with the various costs described above to determine the overall cost.

In some examples, the parking manager 202 may include a trajectory determining component 208 configured to select or determine a candidate trajectory based on the candidate trajectory having the lowest cost. In some examples, the trajectory determining component 208 may receive trajectory and/or cost information from the cost generator 206. In some examples, the trajectory determining component 208 may select the trajectory 220 to follow to the parking space 210. The trajectory determining component 208 may determine which trajectory 220 to select based on the costs generated by the cost generator 206. In some instances, the trajectory determining component 208 may select the trajectory 220 with the lowest cost. If the trajectory determining component 208 is selecting a trajectory 220 based on multiple different parking spaces, the trajectory determining component 208 may identify the trajectories 220 with the lowest costs from each parking space 210 and compare such costs to identify which parking space and/or trajectory 220 to select. In some examples, the trajectory determining component 208 may send the selected trajectory 230 to a planning component 232. In such instances, the planning component 232 may utilize the trajectory 230 by causing the vehicle to follow the trajectory 230 to the parking space 210.

Figure 3A:
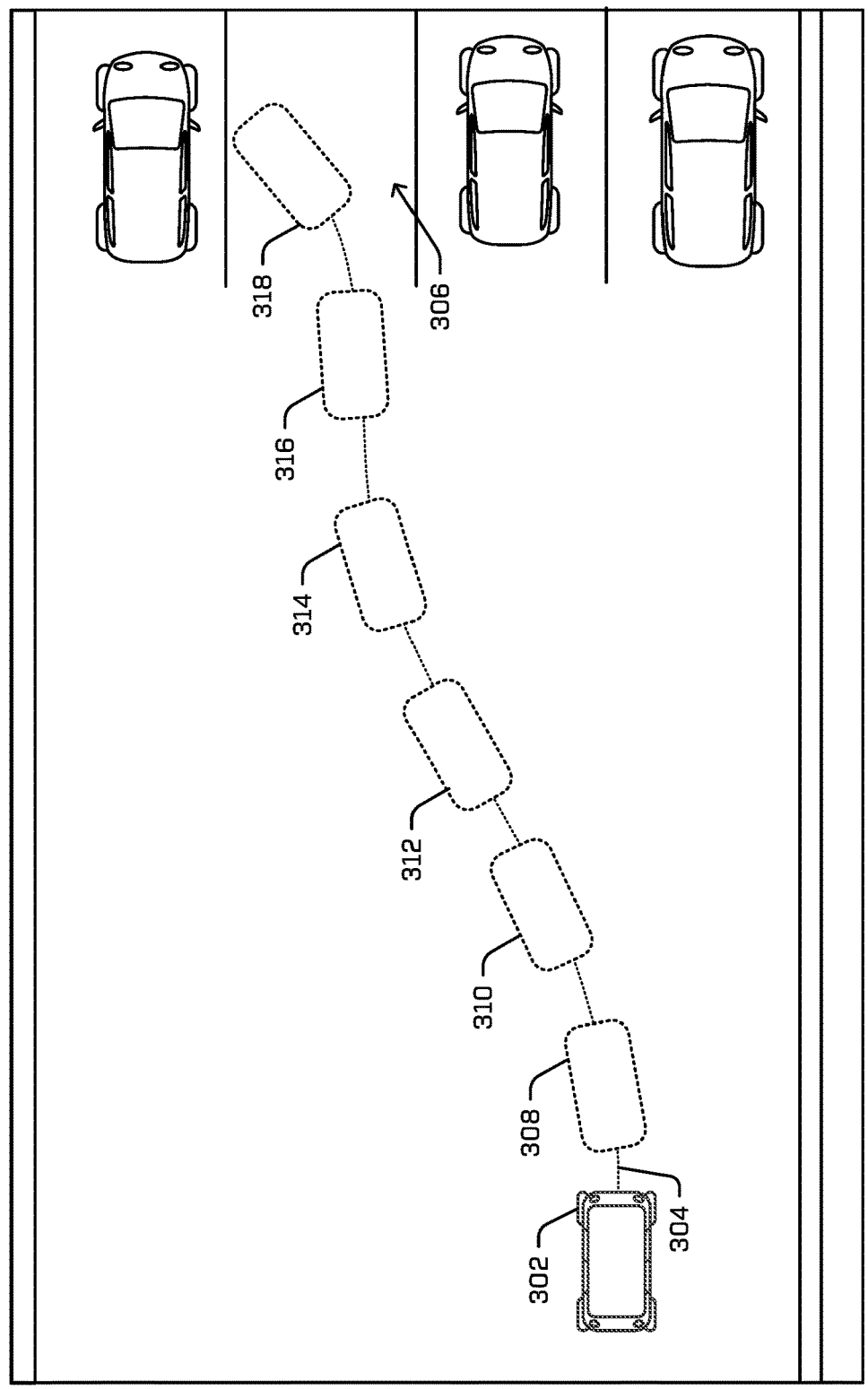
FIG. 3A depicts an example environment of a vehicle traversing along a trajectory with numerous states, in accordance with one or more examples of the disclosure.

FIG. 3 depicts an example environment 300 of a vehicle 302 traversing along a trajectory 304 with numerous states.

In some examples, the example environment 300 may include a vehicle 302. In some examples, the vehicle 302 may include a trajectory 304 configured to instruct the vehicle 302 to traverse to a parking space 306. The parking space 306 may be a stall type parking space with adjacent parking spaces on either side. In some examples, the trajectory 304 may include a number of states that represent what the state of the vehicle 302 may be at a specific moment while following the trajectory 304. State information may include location data, pose data (e.g., lateral offset data, longitudinal offset data, heading offset data), velocity data, acceleration data, and/or other elements. As such, the vehicle may use the predicted states to determine where the vehicle may be and/or characteristics of the vehicle's movement at a future time based on following the trajectory 304. In this example, the trajectory 304 may include a state 308, a state 310, a state 312, a state 314, a state 316, and a state 318. However, this example is not intended to be limiting, in other examples there may be more or less states.

In some examples, the vehicle 302 may identify a parking state for trajectory 304. The vehicle 302 may evaluate trajectory by identifying which of the number of states is the parking state of the trajectory 304. For example, the vehicle 302 may identify the parking state of a vehicle 302 following the trajectory 304 based on the predicted velocity, a proximity to a defined parking space, and the like. In such instances, the vehicle 302 may evaluate the predicted velocity at the various states and identify a state with a predicted velocity that is less than a threshold value. A state that has a predicted velocity below a threshold velocity may indicate that the vehicle 302 has stopped. Further, such a stopped vehicle 302 may indicate that the vehicle 302 has completed the trajectory 304 and is located (e.g., parked) within the parking space 306. In some instances, such states may be identified as parking states. In this example, the vehicle may identify the state 318 as the parking state, as state 318 may include state information that indicates that at the state 318 the vehicle 302 may have a velocity that is less than a threshold value. As described above, such a velocity may indicate that the vehicle 302 has parked within the parking space 306. In some examples, the vehicle 302 may use the parking state to identify the predicted pose of the vehicle 302 within the parking space 306. In various examples, costs may be associated with any of the one or more states 308-316 and a separate cost may be associated with the parking state 318 such that the total trajectory cost is some combination of all costs.

Figure 3B:
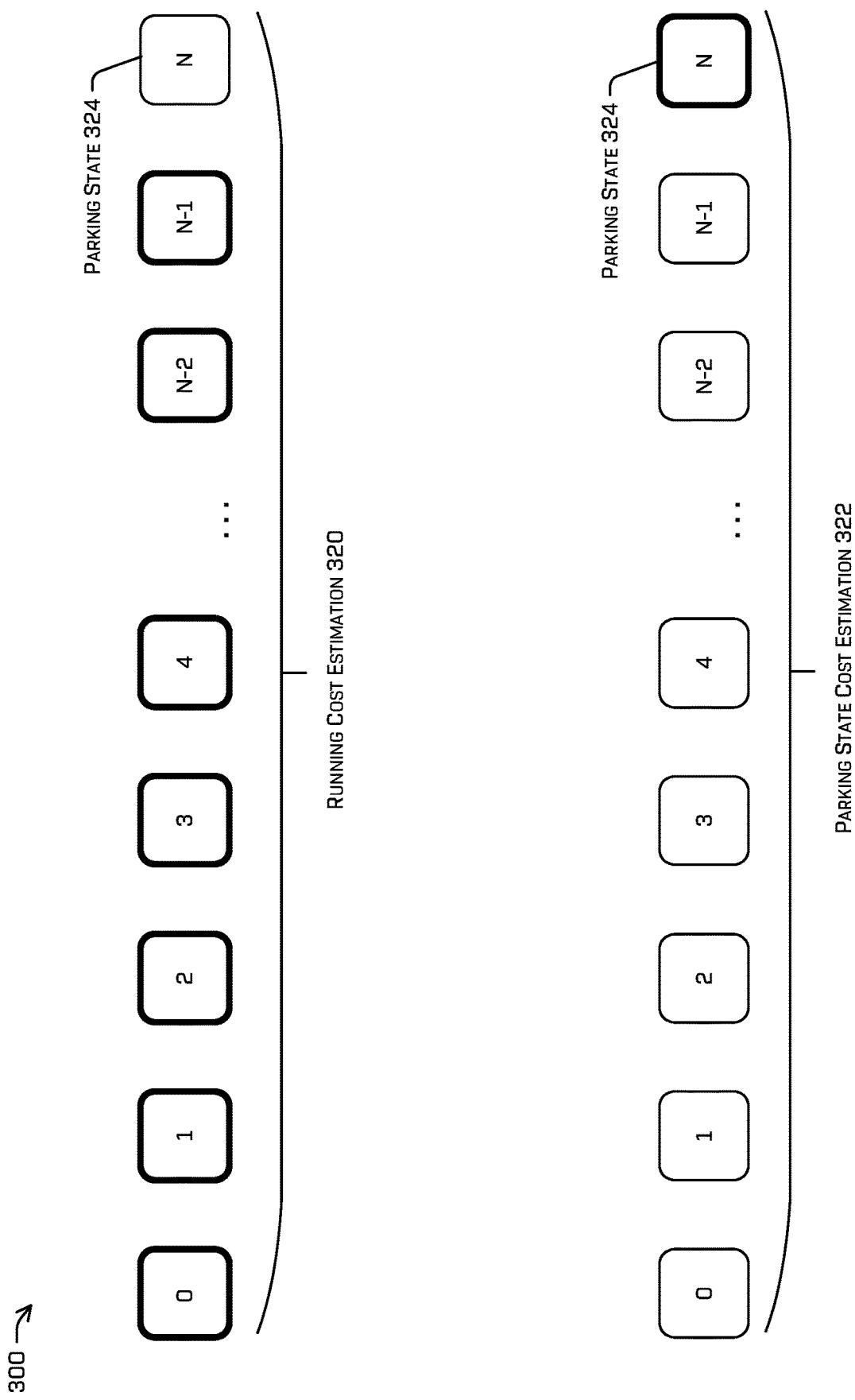
FIG. 3B depicts an example diagram of a series of vehicle states, in accordance with one or more examples of the disclosure.

FIG. 3B depicts an example diagram including a series of vehicle states. Specifically, FIG. 3B describes that the parking cost is estimated using the final, parking state, whereas numerous other costs are determined using a running cost.

In this example, the example diagram may include two distinct methods of determining a cost. The running cost estimation 320 may be a first diagram that describes a first way of determining a cost. The parking state cost estimation 322 may be a second diagram that describes a second way of determining a cost. In some examples, a vehicle may generate or otherwise determine numerous costs, such as reference cost, obstacle cost, steering cost, acceleration cost, yaw cost, debris cost, safety cost, and/or any other cost. In this example, when determining such types of costs, the vehicle may determine the cost using the running cost estimation 320. As illustrated, the running cost estimation 320 may utilize a number of different states. In this example, such states may be labeled "0", "1", "2", "3", "4", "N−2", "N−1", and "N". Further, the state labeled "N" may be the parking state 324 (e.g., state at which the vehicle is parked within a parking space). Using the running cost estimation 320, the vehicle may utilize states "0"-"N−1" to determine costs (e.g., the bolded states). In such instances, the vehicle may determine average values between the states at the different locations. Alternatively, the vehicle may weight earlier or later states more heavily, which may affect the cost values.

In other examples, the vehicle may determine a parking cost, which as described above, may be a measurement how closely aligned the vehicle is within the parking space based on following a particular trajectory. In this example, when determining a parking cost, the vehicle may determine the parking costs using the second way of determining cost, using the parking state cost estimation 322. As illustrated, the parking state cost estimation 322 may utilize a single state, the parking state. In this example, such states may be labeled "0", "1", "2", "3", "4", "N−2", "N−1", and "N". Further, the state labeled "N" may be the parking state 324 (e.g., state at which the vehicle is parked within a parking space). Using the parking state cost estimation 322, the vehicle may utilize solely the parking state 324 to determine the parking cost. In such instances, instead of evaluating some or all the states prior to the parking state 324 like the running cost estimation 320, the parking state cost estimation 322 may determine the parking cost by evaluating the state information at the parking state 324.

Figure 4:
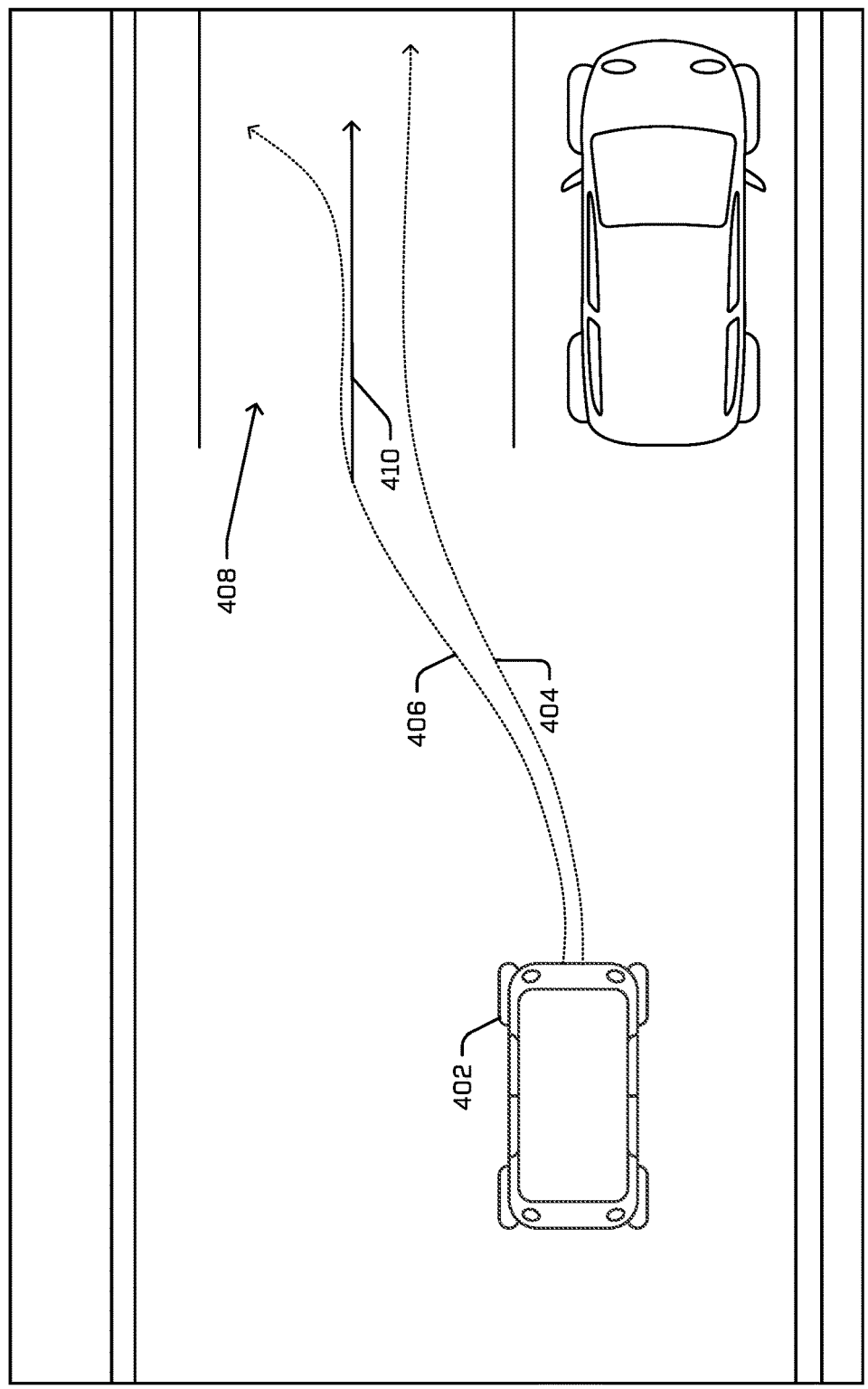
FIG. 4 depicts an example environment of a vehicle with multiple candidate trajectories, in accordance with one or more examples of the disclosure.

FIG. 4 depicts an example environment 400 of a vehicle 402 with multiple candidate trajectories. Specifically, FIG. 4 may illustrate comparing the predicted poses of the trajectories to a target pose.

In this example, the example environment 400 may include a vehicle 402. In some examples, the vehicle 402 may include a first trajectory 404 and a second trajectory 406 configured to instruct the vehicle 402 to traverse to a parking space 408. As described above, the vehicle 402 may receive the parking space 408 from a database based on being within a threshold distance of a destination. In addition to receiving the parking space 408 and the associated location of the parking space 408, the vehicle 402 may also receive a target pose (e.g., stored in the database with the parking space 408) associated with the parking space 408. In this example, the target pose 410 may extend through a middle portion of the parking space 408. The target pose 410 may represent an optimal position and orientation (two- or three-dimensional heading) of a vehicle 402 within the parking space 408. The target position may include a target lateral offset (e.g., y-axis) coordinate and a target longitudinal offset (e.g., x-axis) coordinate of the vehicle 402.

In response to receiving the parking space 408, the vehicle 402 may generate the first trajectory 404 and the second trajectory 406. In some examples, the vehicle 402 may determine which trajectory to follow based on generating an overall cost for the first trajectory 404 and the second trajectory 406. The overall cost may be a combination of various different costs (e.g., reference cost, obstacle cost, steering cost, etc.) including a parking cost. In some examples, a parking cost may be a measurement that represents how closely aligned a predicted pose of the vehicle 402 following a particular trajectory to the parking space 408 is with the target pose 410 of the parking space 408. In such instances, the closer the values of the predicted pose are to the values of the target pose 410, the lower the parking cost (e.g., score) will be. In some examples, the parking cost is determined by comparing the predicted pose of the vehicle 402 parked within the parking space 408 to the target pose 410 of the parking space 408. As described above, the predicted pose may include a predicted lateral offset, a predicted longitudinal offset, and a predicted heading offset. The target pose 410 may include a target lateral offset, a target longitudinal offset, and a target heading offset. In some examples, the vehicle 402 may determine a first value based on comparing the predicted lateral offset to the target lateral offset, a second value based on comparing the predicted longitudinal offset to the target longitudinal offset, and a third value based on comparing the predicted heading offset to the target heading offset. In such instances, the vehicle 402 may determine the parking cost based on combining (e.g., using mathematical operations) the first value, the second value, and the third value.

For example, based on comparing the predicted heading offset of the first trajectory 404 to the target heading offset, in addition to comparing the predicted heading offset of the second trajectory 406 to the target heading offset, the vehicle 402 may determine that the predicted heading offset of the vehicle 402 may be similar to the target heading offset if the vehicle follows the first trajectory 404. Further, based on comparing the predicted lateral offset of the first trajectory 404 to the target lateral offset, in addition to comparing the predicted lateral offset of the second trajectory 406 to the target lateral offset, the vehicle 402 may determine that the predicted lateral offset of the vehicle 402 may be similar based on following either trajectory. Further, based on comparing the predicted longitudinal offset of the first trajectory 404 to the target longitudinal offset, in addition to comparing the predicted longitudinal offset of the second trajectory 406 to the target longitudinal offset, the vehicle 402 may determine that the predicted longitudinal offset of the vehicle 402 may more closely aligned to the target longitudinal offset if the vehicle 402 follows the second trajectory 406. In some examples, the vehicle 402 may utilize such comparisons to determine a parking cost associated with each trajectory.

Figure 5:
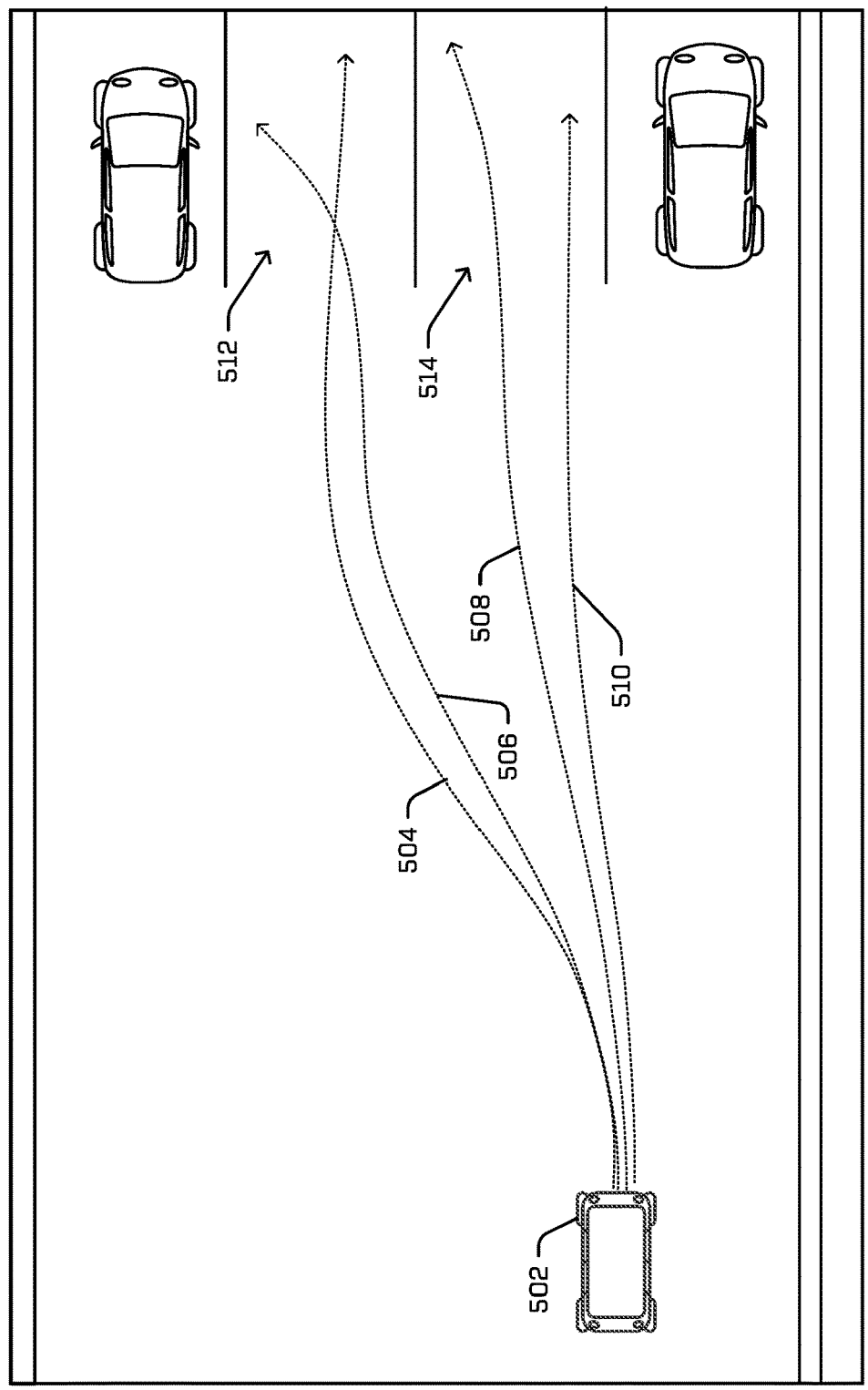
FIG. 5 depicts an example environment of a vehicle with multiple potential parking spaces and multiple candidate trajectories, in accordance with one or more examples of the disclosure.

FIG. 5 depicts an example environment 500 of a vehicle 502 with multiple potential parking spaces and multiple candidate trajectories. Specifically, FIG. 5 may illustrate how the vehicle 502 may select and/or determine a trajectory between multiple parking spaces.

In this example, the example environment 500 may include a vehicle 502. In some examples, the vehicle 502 may include a first trajectory 504 and a second trajectory 506 configured to instruct the vehicle 502 to traverse to a first parking space 512. Further, the vehicle 502 may include a third trajectory 508 and a fourth trajectory 510 configured to instruct the vehicle 502 to traverse to a second parking space 514. In some examples, the first parking space 512 may include a first target pose, and the second parking space 514 may include a second target pose. In some examples, the first target pose and the second target pose may be the same, similar, or different than the other. Accordingly, the vehicle 502 may compare the first predicted pose of the vehicle 502 in a parked state following the first trajectory 504 with the first target pose of the first parking space 512, in addition to comparing the second predicted pose of the vehicle 502 in a parked state following the second trajectory 506 with the first target pose. Further, the vehicle 502 may compare the third predicted pose of the vehicle 502 in a parked state following the third trajectory 508 with the second target pose of the second parking space 514, in addition to comparing the fourth predicted pose of the vehicle 502 in a parked state following the fourth trajectory 510 with the fourth target pose. As described above in FIGS. 1-4, the vehicle 502 may determine a first cost for the first trajectory 504, a second cost for the second trajectory 506, a third cost for the third trajectory 508, and a fourth cost for the fourth trajectory 510.

In some examples, the vehicle 502 may determine which trajectory to select based on the generated costs. In some instances, the vehicle 502 may select the trajectory with the lowest cost. Since there are multiple parking spaces, the vehicle 502 may identify the trajectories with the lowest costs from the first parking space 512 and the second parking space 514 and compare such costs to identify which parking space and/or trajectory to select. Alternatively, or additionally, the vehicle 502 may also determine which trajectory to follow and/or parking space to select based on weather data, passenger characteristics (e.g., passenger age, passenger disabilities, etc.), passenger destination (e.g., city, neighborhood, etc.), the next requested destination, etc. Example techniques for determining which trajectories and/or parking spaces to select and/or determine based on weather conditions can be found, for example, in U.S. patent Pub. Ser. No. 17/240,365, filed Apr. 26, 2021, and titled "Trajectory Modification Based On Wind Compensation" the contents of which is herein incorporated by reference in its entirety and for all purposes.

Figure 6:
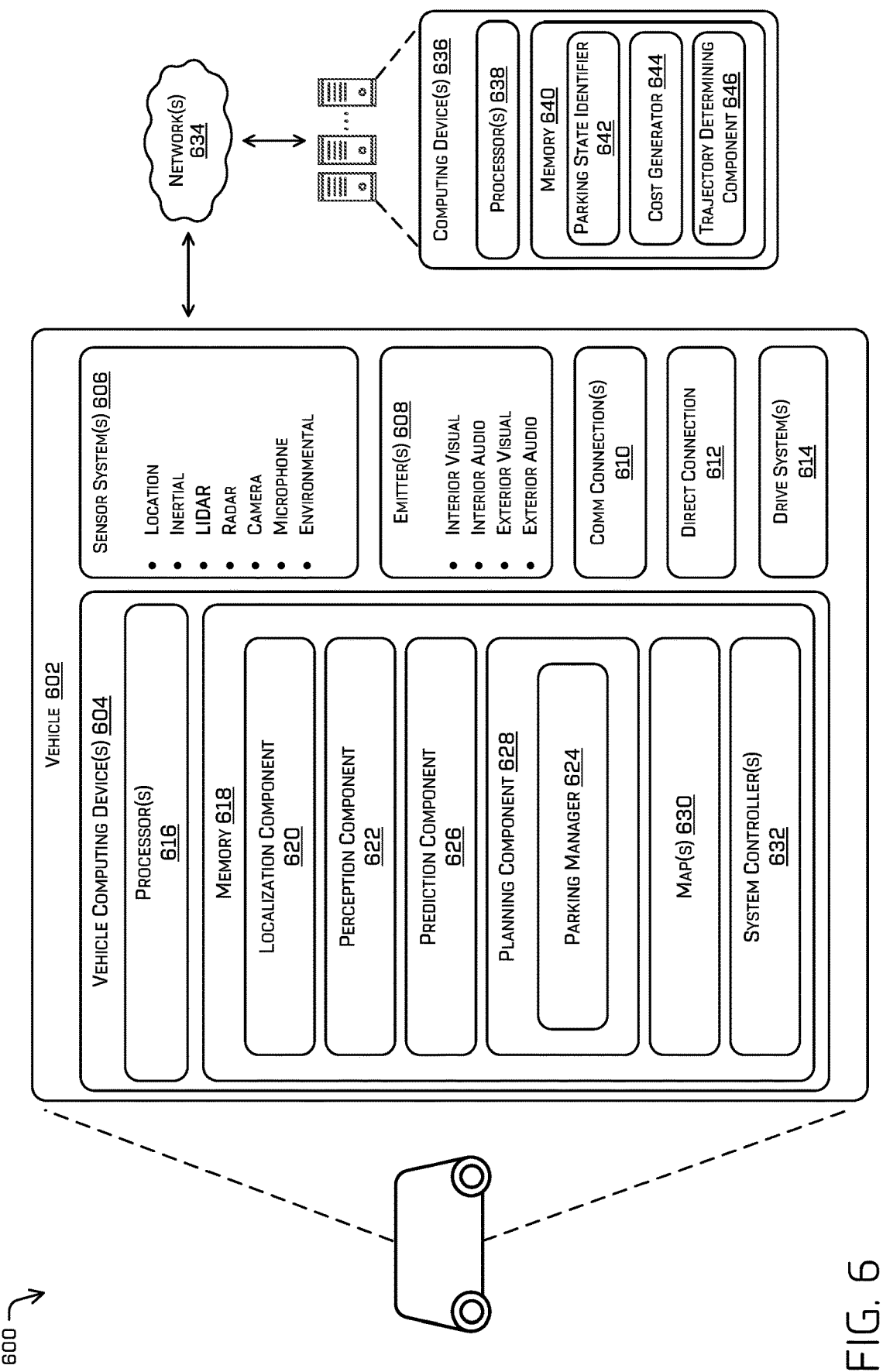
FIG. 6 depicts a block diagram of an example system for implementing various techniques described herein.

FIG. 6 is a block diagram of an example system 600 for implementing the techniques described herein. In at least one example, the system 600 may include a vehicle, such as vehicle 602. The vehicle 602 may include one or more vehicle computing devices 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the processor(s) 616. In the illustrated example, the vehicle 602 is an autonomous vehicle; however, the vehicle 602 could be any other type of vehicle, such as a semi-autonomous vehicle, or any other system having at least an image capture device (e.g., a camera-enabled smartphone). In some instances, the autonomous vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification.

In the illustrated example, the memory 618 of the vehicle computing device 604 stores a localization component 620, a perception component 622, a prediction component 626, a planner component 628 including a parking manager 624, one or more system controllers 632, and one or more maps 630 (or map data). Though depicted in FIG. 6 as residing in the memory 618 for illustrative purposes, it is contemplated that the localization component 620, the perception component 622, the prediction component 626, the planner component 628 including an parking manager 624, system controller(s) 632, and/or the map(s) may additionally, or alternatively, be accessible to the vehicle 602 (e.g., stored on, or otherwise accessible by, memory remote from the vehicle 602, such as, for example, on memory 640 of one or more computing device 636). In some examples, the memory 640 may include a parking state identifier 642, a cost generator 644, and a trajectory determining component 646.

In at least one example, the localization component 620 may include functionality to receive sensor data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 630, and may continuously determine a location and/or orientation of the vehicle 602 within the environment. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 602. In some instances, the localization component 620 may provide data to various components of the vehicle 602 to determine an initial position of the vehicle 602 for determining the relevance of an object to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 626 may generate one or more probability maps representing prediction probabilities of possible locations of one or more objects in an environment. For example, the prediction component 626 may generate one or more probability maps for vehicles, pedestrians, animals, and the like within a threshold distance from the vehicle 602. In some instances, the prediction component 626 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 626 may generate predicted trajectories of objects (e.g., objects) in an environment. For example, the prediction component 626 may generate one or more predicted trajectories for objects within a threshold distance from the vehicle 602. In some examples, the prediction component 626 may measure a trace of an object and generate a trajectory for the object based on observed and predicted behavior.

In general, the planner component 628 may determine a path for the vehicle 602 to follow to traverse through an environment. For example, the planner component 628 may determine various routes and trajectories and various levels of detail. For example, the planner component 628 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 628 may generate an instruction for guiding the vehicle 602 along at least a portion of the route from the first location to the second location. In at least one example, the planner component 628 may determine how to guide the vehicle 602 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 628 may select a trajectory for the vehicle 602.

In other examples, the planner component 628 may alternatively, or additionally, use data from the localization component 620, the perception component 622, and/or the prediction component 626 to determine a path for the vehicle 602 to follow to traverse through an environment. For example, the planner component 628 may receive data (e.g., object data) from the localization component 620, the perception component 622, and/or the prediction component 626 regarding objects associated with an environment. In some examples, the planner component 628 receives data for relevant objects within the environment. Using this data, the planner component 628 may determine a route to travel from a first location (e.g., a current location) to a second location (e.g., a target location) to avoid objects in an environment. In at least some examples, such a planner component 628 may determine there is no such collision-free path and, in turn, provide a path that brings vehicle 602 to a safe stop avoiding all collisions and/or otherwise mitigating damage.

The parking manager 624 may be perform any of the techniques described with respect to any of FIGS. 1-5 above with respect selecting parking trajectories based on predicted pose data of the vehicle 602 within a parking location.

In at least one example, the vehicle computing device 604 may include one or more system controllers 632, which may be configured to control steering, propulsion, braking, safety, emitters, communication, and other systems of the vehicle 602. The system controller(s) 632 may communicate with and/or control corresponding systems of the drive system(s) 614 and/or other components of the vehicle 602.

The memory 618 may further include one or more maps 630 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 630. That is, the map(s) 630 may be used in connection with the localization component 620, the perception component 622, the prediction component 626, and/or the planner component 628 to determine a location of the vehicle 602, detect objects in an environment, generate routes, determine actions and/or trajectories to navigate within an environment.

In some examples, the one or more maps 630 may be stored on a remote computing device(s) (such as the computing device(s) 636) accessible via network(s) 634. In some examples, multiple maps 630 may be stored based on, for example, a characteristic (e.g., type of entity, time of day, day of week, season of the year, etc.). Storing multiple maps 630 may have similar memory requirements, but increase the speed at which data in a map may be accessed.

In some instances, aspects of some or all of the components discussed herein may include any models, techniques, and/or machine-learned techniques. For example, in some instances, the components in the memory 618 (and the memory 640, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or in the alternative, the sensor system(s) 606 may send sensor data, via the one or more networks 634, to the one or more computing device(s) 636 at a particular frequency, after a lapse of a predetermined period of time, in near real-time, etc.

The vehicle 602 may also include one or more emitters 608 for emitting light and/or sound. The emitter(s) 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., computing device 636, other nearby vehicles, etc.) and/or one or more remote sensor system(s) for receiving sensor data. The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 634. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive module with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the parking manager 624, the prediction component 626, the planner component 628, the one or more system controllers 632, and the one or more maps 630 may process sensor data, as described above, and may send their respective outputs, over the one or more network(s) 634, to the computing device(s) 636. In at least one example, the localization component 620, the perception component 622, the parking manager 624, the prediction component 626, the planner component 628, the one or more system controllers 632, and the one or more maps 630 may send their respective outputs to the computing device(s) 636 at a particular frequency, after a lapse of a predetermined period of time, in near real-time, etc.

In some examples, the vehicle 602 may send sensor data to the computing device(s) 636 via the network(s) 634. In some examples, the vehicle 602 may receive sensor data from the computing device(s) 636 and/or remote sensor system(s) via the network(s) 634. The sensor data may include raw sensor data and/or processed sensor data and/or representations of sensor data. In some examples, the sensor data (raw or processed) may be sent and/or received as one or more log files.

The computing device(s) 636 may include processor(s) 638 and a memory 640, which may include a parking state identifier 642, a cost generator 644, and a trajectory determining component 646. In some examples, the memory 640 may store one or more of components that are similar to the component(s) stored in the memory 618 of the vehicle 602. In such examples, the computing device(s) 636 may be configured to perform one or more of the processes described herein with respect to the vehicle 602. In some examples, the parking state identifier 642, a cost generator 644, and a trajectory determining component 646 may perform substantially similar functions as the parking manager 624.

The processor(s) 616 of the vehicle 602 and the processor(s) 638 of the computing device(s) 636 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 640 are examples of non-transitory computer-readable media. The memory 618 and memory 640 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 636 and/or components of the computing device(s) 636 may be associated with the vehicle 602. That is, the vehicle 602 may perform one or more of the functions associated with the computing device(s) 636, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 7:
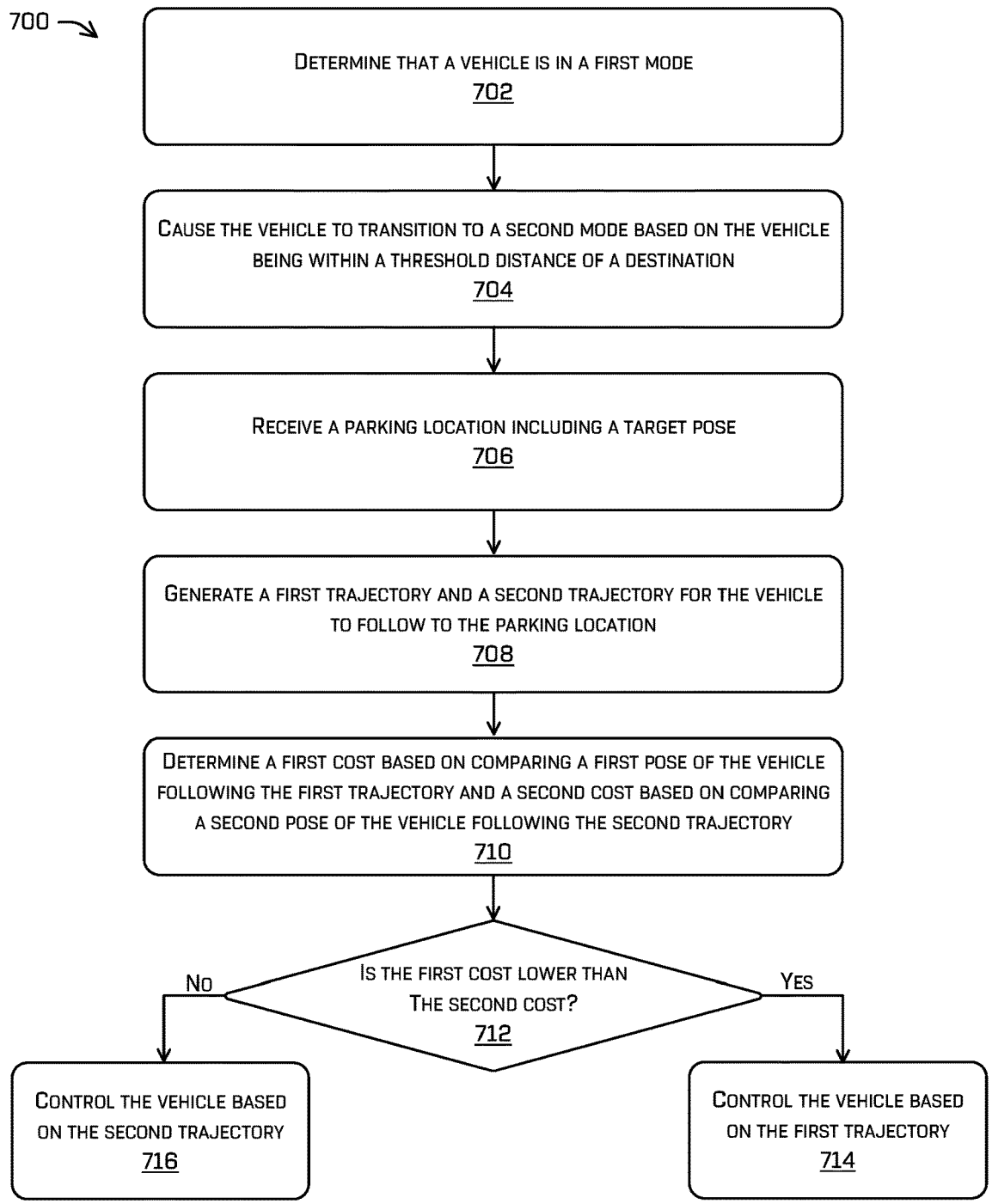
FIG. 7 is a flow diagram illustrating an example process for receiving a set of parking spaces, generating candidate trajectories to such parking spaces, determining a cost for the candidate trajectories, and determining a candidate trajectory based on the cost.

FIG. 7 is a flow diagram illustrating an example process 700 for receiving a set of parking spaces, generating candidate trajectories to such parking spaces, determining a cost for the candidate trajectories, and determining a candidate trajectory based on the cost. As described below, example process 700 may be performed by one or more computer-based components configured to implement various functionalities described herein. For instance, some or all of the operations of example process 700 may be performed by a parking manager 202 configured select parking trajectories based on predicted vehicle pose data. As described above, a parking manager 202 may be integrated as an on-vehicle system in some examples. However, in other examples, the parking manager 202 may be integrated as a separate server-based system.

Process 700 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 702, the parking manager may include determining that a vehicle is in a first mode. The vehicle may utilize numerous operation modes configured to instruct the vehicle how to generate and/or select trajectories. In some examples, different operating mode types may cause the vehicle to generate different cost measurements when generating and/or selecting a trajectory to follow. In some examples, the first mode may be a primary operating mode of the vehicle. When operating in a primary mode, the vehicle may generate a first set of costs. In such instances, the vehicle may use the first set of costs to generate a trajectory and/or determining which potential trajectory to select while navigating to the destination.

At operation 704, the parking manager may include causing the vehicle to transition to a second mode based on the vehicle being within a threshold distance of a destination. In some examples, the vehicle may transition from the primary mode to a parking mode based on determining that the vehicle is within a threshold distance from the destination. In such instances, the threshold distance may be determined based on a number of different factors, such as the environment type, time of day, and/or other factors. In other situations, the threshold distance may be a fixed distance. In some examples, the second mode may be a parking mode. In such instances, when operating in a parking mode, the parking manager may generate a second set of costs. The second costs may include some or all of the first set of costs, in addition to additional costs. Based on being in a parking mode, the parking manager may generate additional costs associated with selecting parking trajectories and/or parking spaces.

At operation 706, the parking manager may include receiving a parking location including a target pose. Based on transitioning to the second mode (e.g., parking mode) the vehicle may receive a parking location (e.g., parking spaces, parking garages, parking lots, etc.) that is within a threshold distance of the destination. The vehicle may receive the parking location from a database (e.g., on-vehicle database or off-vehicle database) available to the vehicle. The database may include map data that indicates the location of parking space proximate the destination. In addition to receiving the parking space and the associated location of the parking space, the parking manager may also receive target pose (e.g., stored in the database with the parking space) associated with the received parking space. A target pose may represent an optimal position and orientation (two- or three-dimensional heading) of a vehicle within the parking space. The target position may include a target lateral offset (e.g., y-axis) coordinate and a target longitudinal offset (e.g., x-axis) coordinate of the vehicle.

At operation 708, the parking manager may include generating a first trajectory and a second trajectory for the vehicle to follow to the parking location. Upon receiving the parking location, the parking manager may generate a first trajectory and a second trajectory to the parking space. In some examples, the first trajectory and the second trajectory may differ from one another based on the velocity, the pose, and/or the acceleration of such trajectories. Further, such trajectories may cause the vehicle to stop and/or be positioned at different locations within the parking space. For example, the first trajectory and the second trajectory may include a different predicted pose of the vehicle within the parking space.

Additionally, the first trajectory and the second trajectory may include numerous predicted states that represent the state information of the vehicle at a specific location along the trajectory. For example, the first trajectory and the second trajectory may have a number of states that represents what the state of a vehicle may be at a specific moment on the trajectory. State information may include location data, pose data (e.g., lateral offset data, longitudinal offset data, heading offset data), velocity data, acceleration data, and/or other elements. As such, the parking manager may evaluate the predicted states to determine where the vehicle may be and/or characteristics of the vehicle's movement at a future time based on following such trajectories.

In some examples, the parking manager may identify parking states for the first trajectory and the second trajectory. The parking manager may evaluate such trajectories by identifying which on the number of states is the parking state of the trajectories. For example, the parking manager may identify the parking state of a vehicle following a trajectory based on the predicted velocity. In such instances, the parking manager may evaluate the predicted velocity at the various states and identify a state with a predicted velocity that is less than a threshold value. A state that has a predicted velocity below a threshold velocity may indicate that the vehicle has stopped. Further, such a stopped vehicle may indicate that the vehicle has completed the first trajectory or the second trajectory and is located (e.g., parked) within the parking space. In some instances, such states may be identified as parking states.

At operation 710, the parking manager may include determining a first cost based on comparing a first pose of the vehicle following the first trajectory and a second cost based on comparing a second pose of the vehicle following the second trajectory. Based on identifying the first parking state of the first trajectory and the second parking state of the second trajectory, the parking manager may use the state information of the vehicle at the parking state to generate a cost associated with such trajectories. In this example, a first cost and the second cost may be a measurement that represents how closely aligned the first predicted pose and the second predicted pose of the vehicle at the first parking state and the second parking state are with the target pose of the parking space. In such instances, the closer the values of the predicted pose are to the values of the target pose, the lower the cost (e.g., score) will be. In some examples, the first cost is determined by comparing the first predicted pose of the vehicle at the first parking state to the target pose of the parking space, and the second cost is determined by comparing the second predicted pose of the vehicle at the second parking state to the target pose of the parking space.

At operation 712, the parking manager may include determining whether the first cost is less than the second cost. The parking manager may determine which cost is lower based on comparing the costs associated with the first trajectory and the second trajectory. If the first cost is less than the second cost (712: Yes), then the parking manager may select the first trajectory. The example process 700 includes the parking manager selecting the first trajectory based on the first cost of the first trajectory being less than the second cost of the second trajectory. At operation 714, the process 700 may include controlling the vehicle based on the first trajectory. In some examples, upon identifying that the first trajectory has the lowest cost, the vehicle may follow the trajectory to the parking space.

In contrast, if the first cost is not less than the second cost (712: No), then the parking manager may select the second trajectory. The example process 700 includes the parking manager selecting the second trajectory based on the first cost of the first trajectory being greater than the second cost of the second trajectory. At operation 716, the process 700 may include controlling the vehicle based on the second trajectory. In some examples, upon identifying that the second trajectory has the lowest cost, the vehicle may follow the trajectory to the parking space.

EXAMPLE CLAUSES

A: A system comprising: one or more processors; and one or more non-transitory computer-readable media storing computer-executable instructions that, when executed, cause the one or more processors to perform operations comprising: determining that an autonomous vehicle is within a threshold distance from a destination; receiving, based at least in part on the autonomous vehicle being within the threshold distance, a parking location associated with a target pose for the autonomous vehicle; determining a first trajectory and a second trajectory associated with navigating the autonomous vehicle to the parking location, the first trajectory associated with a first parking state and the second trajectory associated with a second parking state; determining, based at least in part on comparing the first parking state with the target pose, a first parking cost; determining, for a portion of the first trajectory other than the first parking state, a first trajectory cost; determining, based at least in part on comparing the second parking state with the target pose, a second parking cost; determining, for a portion of the second trajectory other than the second parking state, a second trajectory cost; and controlling the autonomous vehicle based at least in part on the first trajectory, first parking, second trajectory, and second parking costs.

B: The system of paragraph A, wherein the parking location is a first parking location, the operations further comprising: receiving a second parking location associated with a second target pose for the autonomous vehicle; determining a third trajectory for the autonomous vehicle to follow to the second parking location associated with a third parking state; determining a third parking cost associated with the third trajectory; and determining a third trajectory cost associated with a portion of the third trajectory other than the third parking state, wherein controlling the autonomous vehicle is further based at least in part on the third parking cost and the third trajectory cost.

C: The system of paragraph A, wherein determining the first trajectory comprises performing a tree search; and wherein the first trajectory cost comprises one or more of: a progress cost, a safety cost, or a comfort cost.

D: The system of paragraph A, wherein the first parking cost is based at least in part on of one or more of: a lateral difference between the autonomous vehicle and the target pose, a longitudinal difference between the autonomous vehicle and the target pose, or a heading difference between the autonomous vehicle in the first parking state and the target pose.

E: The system of paragraph D, wherein a combination of the lateral difference, the longitudinal difference, and the heading difference comprises a weighted sum.

F: One or more non-transitory computer-readable media storing instructions executable by one or more processors, wherein the instructions, when executed, cause the one or more processors to perform operations comprising: determining that a vehicle is within a threshold distance from a destination; receiving, based at least in part on being within the threshold distance, a parking location comprising one or more of a target position or orientation; determining a first trajectory for the vehicle to follow to the parking location, the first trajectory including a first parking state; determining, for a portion of the first trajectory other than the first parking state, a first trajectory cost; determining, based at least in part on the parking location and the first parking state, a first parking cost; and controlling the vehicle based at least in part on the first trajectory cost and the first parking cost.

G: The one or more non-transitory computer-readable media of paragraph F, wherein the parking location is a first parking location, further comprising: receiving a second parking location associated with a second target pose for the vehicle; determining a third trajectory for the vehicle to follow to the second parking location associated with a third parking state; determining a third parking cost associated with the third trajectory; and determining a third trajectory cost associated with a portion of the third trajectory other than the third parking state, wherein controlling the vehicle is further based at least in part on the third parking cost and the third trajectory cost.

H: The one or more non-transitory computer-readable media of paragraph F, wherein determining the first trajectory comprises performing a tree search; and wherein the first trajectory cost comprises one or more of: a progress cost, a safety cost, or a comfort cost.

I: The one or more non-transitory computer-readable media of paragraph F, wherein the first parking cost is associated with an infinite time horizon.

J: The one or more non-transitory computer-readable media of paragraph F, wherein the first parking cost is based at least in part on of one or more of: a lateral difference between the vehicle and the target position, a longitudinal difference between the vehicle and the target position, or a heading difference between the vehicle in the first parking state and the target orientation.

K: The one or more non-transitory computer-readable media of paragraph J, wherein a combination of the lateral difference, the longitudinal difference, and the heading difference comprises a weighted sum.

L: The one or more non-transitory computer-readable media of paragraph K, wherein determining the first trajectory cost comprises determining a plurality of costs, wherein the plurality of costs comprise one or more of: an obstacle cost, a reference cost, a steering cost, an acceleration cost, a debris cost, a safety cost, or a yaw cost.

M: The one or more non-transitory computer-readable media of paragraph F, wherein controlling the vehicle further comprises: controlling the vehicle to proceed along the first trajectory.

N: A method comprising: determining that a vehicle is within a threshold distance from a destination; receiving, based at least in part on being within the threshold distance, a parking location comprising one or more of a target position or orientation; determining a first trajectory for the vehicle to follow to the parking location, the first trajectory including a first parking state; determining, for a portion of the first trajectory other than the first parking state, a first trajectory cost; determining, based at least in part on the parking location and the first parking state, a first parking cost; and controlling the vehicle based at least in part on the first trajectory cost and the first parking cost.

O: The method of paragraph N, wherein the parking location is a first parking location, further comprising: receiving a second parking location associated with a second target pose for the vehicle; determining a third trajectory for the vehicle to follow to the second parking location associated with a third parking state; determining a third parking cost associated with the third trajectory; and determining a third trajectory cost associated with a portion of the third trajectory other than the third parking state, wherein controlling the vehicle is further based at least in part on the third parking cost and the third trajectory cost.

P: The method of paragraph N, wherein determining the first trajectory comprises performing a tree search; and wherein the first trajectory cost comprises one or more of: a progress cost, a safety cost, or a comfort cost.

Q: The method of paragraph N, wherein the first parking cost is associated with an infinite time horizon.

R: The method of paragraph N, wherein the first parking cost is based at least in part on of one or more of: a lateral difference between the vehicle and the target position, a longitudinal difference between the vehicle and the target position, or a heading difference between the vehicle in the first parking state and the target orientation.

S: The method of paragraph R, wherein a combination of the lateral difference, the longitudinal difference, and the heading difference comprises a weighted sum.

T: The method of paragraph S, wherein determining the first trajectory cost comprises determining a plurality of costs, wherein the plurality of costs comprise one or more of: an obstacle cost, a reference cost, a steering cost, an acceleration cost, a debris cost, a safety cost, or a yaw cost.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the one or more processors to perform operations comprising:
determining that an autonomous vehicle is within a threshold distance from a destination;
receiving, from map data of the autonomous vehicle and based at least in part on the autonomous vehicle being within the threshold distance, a parking location associated with a target pose for the autonomous vehicle;
determining a first trajectory and a second trajectory associated with navigating the autonomous vehicle to the parking location, the first trajectory associated with a first parking state and the second trajectory associated with a second parking state;
determining, based at least in part on a parking pose prioritization and comparing the first parking state with the target pose, a first parking cost;
determining, for a portion of the first trajectory other than the first parking state, a first trajectory cost;
determining, based at least in part on the parking pose prioritization and comparing the second parking state with the target pose, a second parking cost;

determining, for a portion of the second trajectory other than the second parking state, a second trajectory cost; and controlling the autonomous vehicle based at least in part on the first trajectory cost, the first parking cost, the second trajectory cost, and the second parking cost.

2. The system of claim 1, wherein the parking location is a first parking location, the operations further comprising:
receiving a second parking location associated with a second target pose for the autonomous vehicle;
determining a third trajectory for the autonomous vehicle to follow to the second parking location associated with a third parking state;
determining a third parking cost associated with the third trajectory; and
determining a third trajectory cost associated with a portion of the third trajectory other than the third parking state,
wherein controlling the autonomous vehicle is further based at least in part on the third parking cost and the third trajectory cost.

3. The system of claim 1, wherein determining the first trajectory comprises performing a tree search; and
wherein the first trajectory cost comprises one or more of:
a progress cost,
a safety cost, or
a comfort cost.

4. The system of claim 1, wherein the first parking cost is based at least in part on of one or more of:
a lateral difference between the autonomous vehicle and the target pose,
a longitudinal difference between the autonomous vehicle and the target pose, or
a heading difference between the autonomous vehicle in the first parking state and the target pose.

5. The system of claim 4, wherein a combination of the lateral difference, the longitudinal difference, and the heading difference comprises a weighted sum.

6. One or more non transitory computer readable media storing instructions executable by one or more processors, wherein the instructions, when executed, cause the one or more processors to perform operations comprising:
determining that a vehicle is within a threshold distance from a destination;
receiving, from map data of the vehicle and based at least in part on being within the threshold distance, a parking location comprising one or more of a target position or orientation;
determining a first trajectory for the vehicle to follow to the parking location, the first trajectory including a first parking state;
determining, for a portion of the first trajectory other than the first parking state, a first trajectory cost;
determining, based at least in part on a parking pose prioritization, the parking location, and the first parking state, a first parking cost; and
controlling the vehicle based at least in part on the first trajectory cost and the first parking cost.

7. The one or more non transitory computer readable media of claim 6, wherein the parking location is a first parking location, further comprising:
receiving a second parking location associated with a second target pose for the vehicle;
determining a third trajectory for the vehicle to follow to the second parking location associated with a third parking state;
determining a third parking cost associated with the third trajectory; and
determining a third trajectory cost associated with a portion of the third trajectory other than the third parking state,
wherein controlling the vehicle is further based at least in part on the third parking cost and the third trajectory cost.

8. The one or more non transitory computer readable media of claim 6, wherein determining the first trajectory comprises performing a tree search; and
wherein the first trajectory cost comprises one or more of:
a progress cost,
a safety cost, or
a comfort cost.

9. The one or more non transitory computer readable media of claim 6, wherein the first parking cost is associated with an infinite time horizon.

10. The one or more non transitory computer readable media of claim 6, wherein the first parking cost is based at least in part on of one or more of:
a lateral difference between the vehicle and the target position,
a longitudinal difference between the vehicle and the target position, or
a heading difference between the vehicle in the first parking state and a target orientation.

11. The one or more non transitory computer readable media of claim 10, wherein a combination of the lateral difference, the longitudinal difference, and the heading difference comprises a weighted sum.

12. The one or more non transitory computer readable media of claim 11, wherein determining the first trajectory cost comprises determining a plurality of costs, wherein the plurality of costs comprise one or more of:
an obstacle cost,
a reference cost,
a steering cost,
an acceleration cost,
a debris cost,
a safety cost, or
a yaw cost.

13. The one or more non transitory computer readable media of claim 6, wherein controlling the vehicle further comprises:
controlling the vehicle to proceed along the first trajectory.

14. A method comprising:
determining that a vehicle is within a threshold distance from a destination;
receiving, from map data of the vehicle and based at least in part on being within the threshold distance, a parking location comprising one or more of a target position or orientation;
determining a first trajectory for the vehicle to follow to the parking location, the first trajectory including a first parking state;
determining, for a portion of the first trajectory other than the first parking state, a first trajectory cost;
determining, based at least in part on a parking pose prioritization, the parking location, and the first parking state, a first parking cost; and
controlling the vehicle based at least in part on the first trajectory cost and the first parking cost.

15. The method of claim 14, wherein the parking location is a first parking location, further comprising:

receiving a second parking location associated with a second target pose for the vehicle;

determining a third trajectory for the vehicle to follow to the second parking location associated with a third parking state;

determining a third parking cost associated with the third trajectory; and determining a third trajectory cost associated with a portion of the third trajectory other than the third parking state, wherein controlling the vehicle is further based at least in part on the third parking cost and the third trajectory cost.

16. The method of claim 14, wherein determining the first trajectory comprises performing a tree search; and wherein the first trajectory cost comprises one or more of:
a progress cost,
a safety cost, or
a comfort cost.

17. The method of claim 14, wherein the first parking cost is associated with an infinite time horizon.

18. The method of claim 14, wherein the first parking cost is based at least in part on of one or more of:
a lateral difference between the vehicle and the target position,
a longitudinal difference between the vehicle and the target position, or
a heading difference between the vehicle in the first parking state and a target orientation.

19. The method of claim 18, wherein a combination of the lateral difference, the longitudinal difference, and the heading difference comprises a weighted sum.

20. The method of claim 19, wherein determining the first trajectory cost comprises determining a plurality of costs, wherein the plurality of costs comprise one or more of:
an obstacle cost,
a reference cost,
a steering cost,
an acceleration cost,
a debris cost,
a safety cost, or
a yaw cost.

* * * * *